(12) United States Patent
Maruno

(10) Patent No.: US 11,345,255 B2
(45) Date of Patent: May 31, 2022

(54) EMERGENCY ELECTRIC POWER SUPPLY SYSTEM, EMERGENCY ELECTRIC POWER SUPPLY METHOD, AND STORAGE MEDIUM

(71) Applicant: HONDA MOTOR CO., LTD., Tokyo (JP)

(72) Inventor: Naoki Maruno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 37 days.

(21) Appl. No.: 16/893,453

(22) Filed: Jun. 5, 2020

(65) Prior Publication Data

US 2020/0391614 A1    Dec. 17, 2020

(30) Foreign Application Priority Data

Jun. 12, 2019   (JP) .............................. JP2019-109360

(51) Int. Cl.
*B60L 58/18*    (2019.01)
*H02J 7/14*     (2006.01)
*B60L 53/10*    (2019.01)

(52) U.S. Cl.
CPC .............. *B60L 58/18* (2019.02); *B60L 53/11* (2019.02); *H02J 7/14* (2013.01); *B60L 2240/54* (2013.01)

(58) Field of Classification Search
CPC ...... B60L 58/18; B60L 53/11; B60L 2240/54; H02J 7/14; H02J 7/342; H02J 2203/10;
(Continued)

(56) References Cited

U.S. PATENT DOCUMENTS 7,933,694 B2 * 4/2011 Kato ...................... B60K 6/365
                                                    701/22
9,350,173 B2 * 5/2016 Kanayama ................ H02J 3/32
(Continued)

FOREIGN PATENT DOCUMENTS

JP       2007-252118       9/2007
JP       2012-050291       3/2012
(Continued)

OTHER PUBLICATIONS

Japanese Office Action for Japanese Patent Application No. 2019-109360 dated Mar. 15, 2022.

*Primary Examiner* — M Baye Diao
(74) *Attorney, Agent, or Firm* — Amin, Turocy & Watson, LLP

(57) ABSTRACT

An emergency electric power supply system including: an electric power detection unit configured to detect that electric power supply from a first electric power system has stopped; a plurality of charge and discharge devices which cause electric power to be transferred between a second electric power system, which is an electric power system different from the first electric power system and is connectable to a plurality of charge and discharge entities including an electric vehicle, and the charge and discharge entities; and a control unit controls at least some of the plurality of charge and discharge devices to supply electric power from the second electric power system to the electric vehicle when the electric power detection unit detects that the electric power supply from the first electric power system has stopped.

7 Claims, 8 Drawing Sheets

(58) Field of Classification Search
CPC ........ H02J 3/322; Y02T 90/167; Y02T 90/14;
Y02T 90/16; Y02T 90/12; Y02T 10/7072;
Y02T 10/70; Y02T 10/62; Y04S 30/12;
Y04S 10/126; Y02E 60/00
USPC ........................................................ 320/109
See application file for complete search history.

(56) References Cited

U.S. PATENT DOCUMENTS

| | | | |
|---|---|---|---|
| 9,960,634 B2* | 5/2018 | Sada | H02J 7/35 |
| 10,630,081 B2* | 4/2020 | Homma | H02J 7/342 |
| 10,894,484 B2* | 1/2021 | Han | B60L 3/0046 |
| 2007/0037661 A1* | 2/2007 | Yang | B60W 10/08 |
| | | | 477/115 |
| 2010/0100264 A1* | 4/2010 | Kato | B60W 10/26 |
| | | | 701/22 |
| 2013/0201316 A1* | 8/2013 | Binder | H04L 67/12 |
| | | | 348/77 |
| 2015/0032326 A1* | 1/2015 | Fushiki | F02D 41/22 |
| | | | 701/32.1 |
| 2018/0312072 A1* | 11/2018 | Yang | B60L 53/67 |

FOREIGN PATENT DOCUMENTS

| | | | | |
|---|---|---|---|---|
| JP | 2013-193525 | | 9/2013 | |
| JP | 2014-045615 | | 3/2014 | |
| JP | 2016-123274 | | 7/2016 | |
| JP | 2016-177540 | | 10/2016 | |
| JP | 2019-006251 | | 1/2019 | |
| KR | 20110021065 A | * | 3/2011 | ............. B60L 50/60 |
| WO | WO-2009127451 A2 | * | 10/2009 | ............. B60L 58/20 |
| WO | WO-2020230316 A1 | * | 11/2020 | ............... G06F 1/30 |

* cited by examiner

FIG. 3

| CONNECTION USER ID | POWER STORAGE AMOUNT | TYPE OF BATTERY | TYPE OF VEHICLE |
|---|---|---|---|
| 0001 | ○○KWh | STATIONARY BATTERY | - |
| 0002 | ○○KWh | STATIONARY BATTERY | - |
| ⋮ | ⋮ | ⋮ | ⋮ |
| 1001 | ○○KWh | ON-VEHICLE BATTERY | PASSENGER VEHICLE (LARGE VEHICLE) |
| 1002 | ○○KWh | ON-VEHICLE BATTERY | PASSENGER VEHICLE (SMALL VEHICLE) |
| 1003 | ○○KWh | ON-VEHICLE BATTERY | FIRE VEHICLE |
| ⋮ | ⋮ | ⋮ | ⋮ |

| CONNECTION USER ID | POWER STORAGE AMOUNT | TYPE OF BATTERY | TYPE OF VEHICLE | POWER GENERATION FUNCTION OF VEHICLE |
|---|---|---|---|---|
| 0001 | ○○KWh | STATIONARY BATTERY | — | — |
| 0002 | ○○KWh | STATIONARY BATTERY | — | — |
| ... | ... | ... | ... | ... |
| 1001 | ○○KWh | ON-VEHICLE BATTERY | PASSENGER VEHICLE (LARGE VEHICLE) | ABSENCE |
| 1002 | ○○KWh | ON-VEHICLE BATTERY | PASSENGER VEHICLE (SMALL VEHICLE) | PRESENCE |
| 1003 | ○○KWh | ON-VEHICLE BATTERY | FIRE VEHICLE | ABSENCE |
| ... | ... | ... | ... | ... |

EMERGENCY ELECTRIC POWER SUPPLY SYSTEM, EMERGENCY ELECTRIC POWER SUPPLY METHOD, AND STORAGE MEDIUM

CROSS-REFERENCE TO RELATED APPLICATION

Priority is claimed on Japanese Patent Application No. 2019-109360, filed Jun. 12, 2019, the content of which is incorporated herein by reference.

BACKGROUND OF THE INVENTION

Field of the Invention

The present invention relates to an emergency electric power supply system, an emergency electric power supply method, and a storage medium.

Description of Related Art

A power storage amount of an on-vehicle secondary battery mounted on an electric vehicle decreases with use, and accordingly, when the on-vehicle secondary battery is discharged to a lower limit, travel of the electric vehicle cannot continue. Therefore, there is a technique for controlling charging of an on-vehicle secondary battery in accordance with a power storage amount of the on-vehicle secondary battery (see, for example, Japanese Unexamined Patent Application, First Publication No. 2019-6251).

SUMMARY OF THE INVENTION

However, in conventional techniques, for example, when a power failure occurs, it is difficult to charge an on-vehicle secondary battery even if a power storage amount of the on-vehicle secondary battery is insufficient. Therefore, at least during a time period until electric power supply is restored, travel of an electric vehicle may not be able to be resumed.

Aspects according to the present invention have been made in consideration of such circumstances, and one object of the present invention is to provide an emergency electric power supply system, an emergency electric power supply method, and a storage medium, in which a possibility that an electric vehicle can continue traveling even when electric power supply has stopped can be increased.

In order to solve the problem described above and achieve the object, the present invention employs the following aspects.

(1) An emergency electric power supply system according to one aspect of the present invention includes: an electric power detection unit configured to detect that electric power supply from a first electric power system has stopped; a second electric power system which is an electric power system different from the first electric power system and is connectable to a plurality of charge and discharge entities including an electric vehicle; a plurality of charge and discharge devices which cause electric power to be transferred between the charge and discharge entities; and a control unit that controls at least some of the plurality of charge and discharge devices to supply electric power from the second electric power system to the electric vehicle when the electric power detection unit detects that the electric power supply from the first electric power system has stopped.

(2) In the above aspect (1), the control unit may control at least some of the plurality of charge and discharge devices to supply the electric power preferentially to a specific electric vehicle as compared with other electric vehicles when the specific electric vehicle is connected to the second electric power system.

(3) In the above aspect (1) or (2), the control unit may control at least some of the plurality of charge and discharge devices to supply the electric power from the second electric power system to the electric vehicle when the electric power detection unit detects that the electric power supply from the first electric power system has stopped and a power storage amount of an on-vehicle battery used for travel of the electric vehicle is less than a threshold.

(4) In the above aspects (1) to (3), the control unit may control at least some of the plurality of charge and discharge devices such that a power storage amount of each of at least one or more batteries of electric vehicles serving as electric power supply sources after supplying the electric power satisfies a constraint condition when the electric power is supplied from one electric vehicle to another electric vehicle via the second electric power system.

(5) In the above aspects (1) to (4), the electric vehicle may include an electric vehicle having a power generation function, and in the case in which the electric vehicle having the power generation function is connected to the second electric power system, the control unit may request the electric vehicle having the power generation function to generate electric power when an electric power amount that can be supplied through the second electric power system is insufficient for demand.

(6) In the above aspects (1) to (5), a stationary battery may be connected to the second electric power system, and the control unit may control at least some of the plurality of charge and discharge devices such that the electric power is supplied from an electric vehicle connected to the stationary battery and the second electric power system to another electric vehicle.

(7) An emergency electric power supply method according to one aspect of the present invention causing a computer to execute processes of:

detecting that electric power supply from a first electric power system has stopped;

causing electric power to be transferred between a second electric power system, which is an electric power system different from the first electric power system and is connectable to a plurality of charge and discharge entities including an electric vehicle, and the charge and discharge entities; and controlling at least some of a plurality of charge and discharge devices to supply electric power from the second electric power system to the electric vehicle when it is detected that the electric power supply from the first electric power system has stopped.

(8) A non-transitory computer-readable storage medium according to one aspect of the present invention which stores a program causing a computer to execute processes of:

detecting that electric power supply from a first electric power system has stopped;

causing electric power to be transferred between a second electric power system, which is an electric power system different from the first electric power system and is connectable to a plurality of charge and discharge entities including an electric vehicle, and the charge and discharge entities; and controlling at least some of a plurality of charge and discharge devices to supply electric power from the second electric power system to the electric vehicle when it is detected that the electric power supply from the first electric power system has stopped.

According to the above aspects (1) to (8), a possibility that an electric vehicle can continue traveling during a power failure can be increased.

BRIEF DESCRIPTION OF THE DRAWINGS

FIG. 3 is a diagram showing an example of battery data according to the first embodiment.

FIG. 6 is a diagram showing an example of battery data according to a second embodiment.

DETAILED DESCRIPTION OF THE INVENTION

Hereinafter, embodiments of an emergency electric power supply system, an emergency electric power supply method, and a storage medium according to the present invention will be described with reference to the drawings. Although electric vehicles 10 are assumed to be electric cars equipped with secondary batteries in the following description, the electric vehicles 10 are vehicles that can be charged from the outside, and may be electric vehicles equipped with secondary batteries that supply electric power for travel and may be hybrid vehicles or fuel cell vehicles.

First Embodiment

Figure 1:
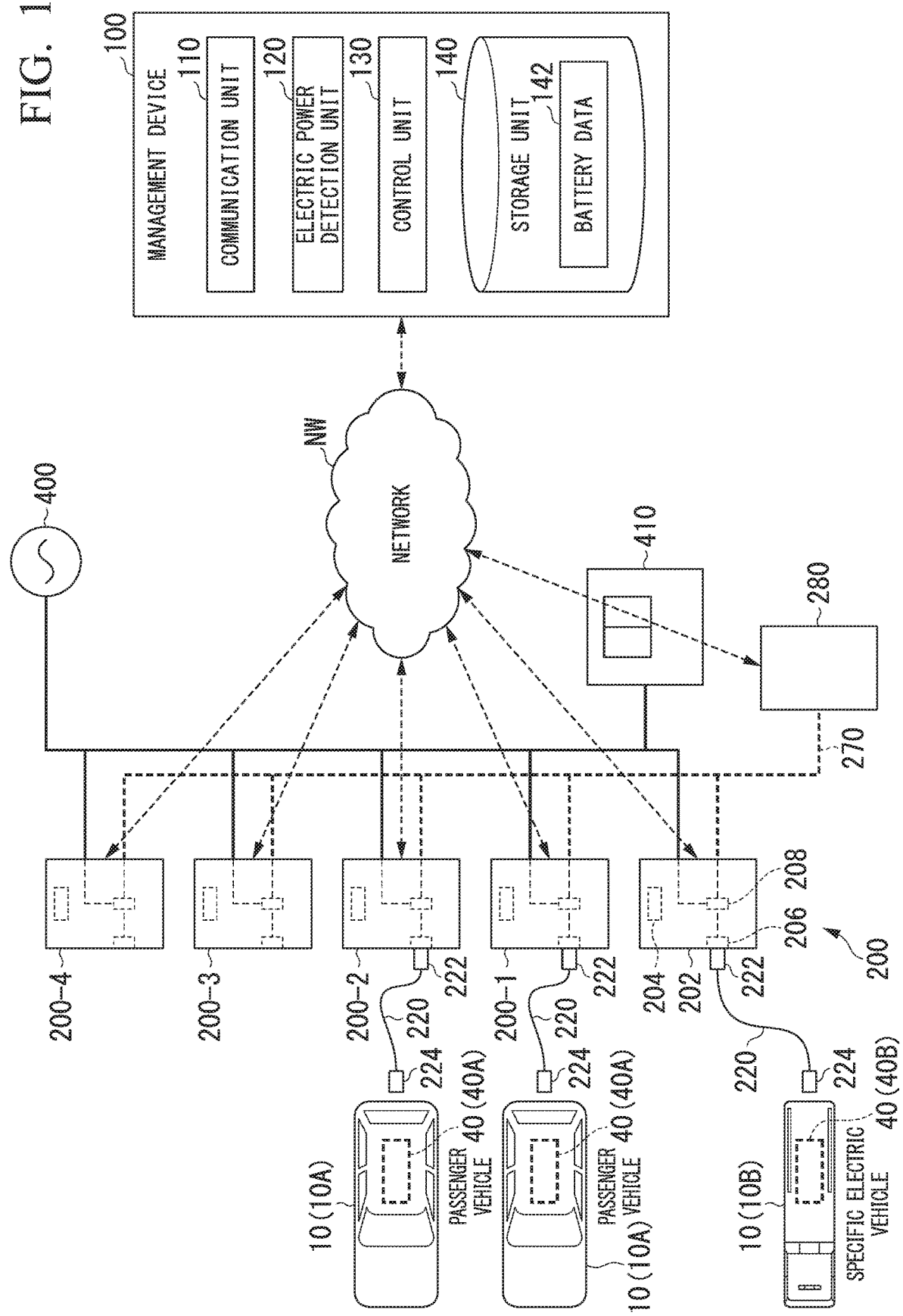
FIG. 1 is a diagram showing an example of a configuration and a usage environment of a management device according to a first embodiment.

Hereinafter, a first embodiment will be described.
[Overall Configuration]
FIG. 1 shows an example of a configuration and a usage environment of a management device 100 that is an emergency electric power supply system according to the first embodiment. In a facility in which one or more charge and discharge devices 200 are installed, the management device 100 manages electric power supply using a second electric power system 270 when electric power supply from a first electric power system 400 has stopped.

The first electric power system 400 includes, for example, a power plant, a substation facility, a transmission line, a distribution facility, a transformer, a protection relay system, and the like. The first electric power system 400 is connected to one or more charge and discharge devices 200 installed in a parking lot or the like. Although FIG. 1 shows charge and discharge devices 200, 200-1, 200-2, 200-3, and 200-4, they will be described as charge and discharge devices 200 when it is unnecessary to distinguish them from each other. The first electric power system 400 supplies electric power to the electric vehicles 10 connected to the charge and discharge devices 200. In addition to the charge and discharge devices 200, the first electric power system 400 is connected to buildings 410 such as a house, a factory, and a commercial facility, and supplies electric power to the buildings 410.

The second electric power system 270 is, for example, a local electric power system to which a stationary battery 280 is connected. The second electric power system 270 performs transfer of electric power with various electric vehicles 10 connected to the charge and discharge devices 200. The various electric vehicles 10 are examples of charge and discharge entities and include a specific electric vehicle 10B such as a police vehicle, an ambulance vehicle, or a fire vehicle in addition to a passenger vehicle 10A. The stationary battery 280 is another example of the charge and discharge entities and is, for example, a secondary battery such as a lithium ion battery. The stationary battery 280 is obtained by diverting an on-vehicle battery mounted on an electric vehicle in the past and is, for example, a battery that is no longer suitable for on-vehicle use because it no longer satisfies a charging capacity for on-vehicle use, or the like. The electric vehicle on which the on-vehicle battery has been mounted may be any vehicle, and may be, for example, an electric vehicle that a user traded in with an operator, or another electric vehicle.

Figure 2:
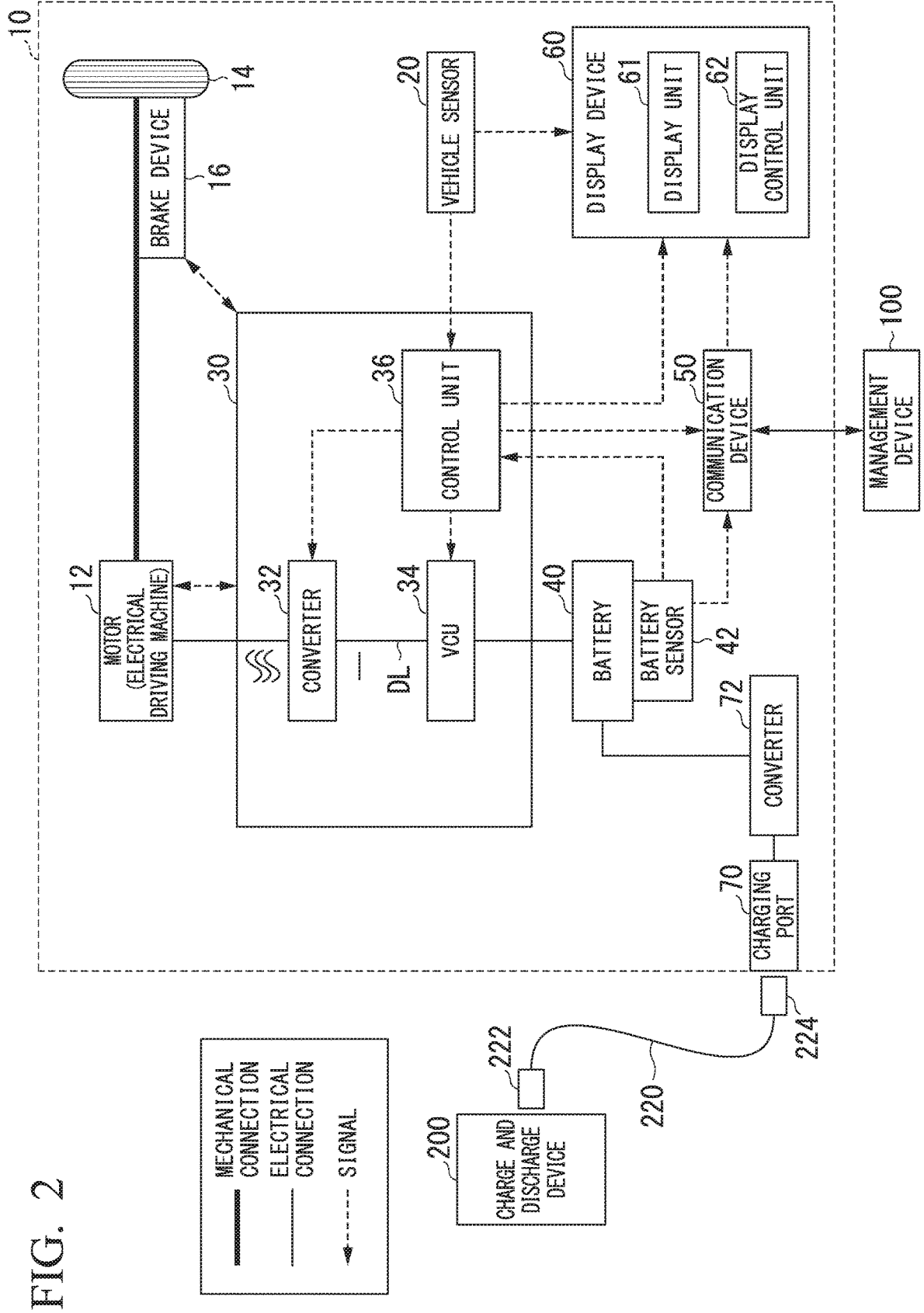
FIG. 2 is a diagram showing an example of a configuration of an electric vehicle.

[Electric Vehicle]
FIG. 2 is a diagram showing an example of a configuration of an electric vehicle 10. As shown in FIG. 2, the electric vehicle 10 includes, for example, a motor 12, a drive wheel 14, a brake device 16, vehicle sensors 20, a power control unit (PCU) 30, a battery 40, battery sensors 42 such as a voltage sensor, a current sensor, and a temperature sensor, and a communication device 50, a display device 60, a charging port 70, and a converter 72.

The motor 12 is, for example, a three-phase AC motor. A rotor of the motor 12 is connected to the drive wheels 14. The motor 12 outputs power to the drive wheels 14 using supplied electric power. The motor 12 generates electric power using kinetic energy of the vehicle when the vehicle decelerates.

The brake device 16 includes, for example, a brake caliper, a cylinder that transmits hydraulic pressure to the brake caliper, and an electric motor that generates hydraulic pressure to the cylinder. The brake device 16 may include, as a backup, a mechanism that transmits hydraulic pressure generated by operating a brake pedal to the cylinder via a master cylinder. The brake device 16 is not limited to the configuration described above and may be an electronically controlled hydraulic brake device that transmits hydraulic pressure of a master cylinder to a cylinder.

The vehicle sensors 20 include an accelerator opening degree sensor, a vehicle speed sensor, and a brake pedaling amount sensor. The accelerator opening degree sensor is attached to an accelerator pedal which is an example of an operator that receives an acceleration instruction from a driver, detects an operation amount of the accelerator pedal, and outputs the detected amount to a control unit 36 as an accelerator opening degree. The vehicle speed sensor includes, for example, a wheel speed sensor attached to each wheel and a speed calculator, derives a speed of the vehicle (a vehicle speed) by integrating wheel speeds detected by each wheel speed sensor, and outputs the vehicle speed to the control unit 36 and the display device 60. The brake pedaling amount sensor is attached to the brake pedal, detects an operation amount of the brake pedal, and outputs the detected operation amount to the control unit 36 as a brake pedaling amount.

The PCU 30 includes, for example, a converter 32, a voltage control unit (VCU) 34, and the control unit 36. Integration of these components into a single unit as the PCU 30 is merely an example and these components may be separately disposed.

The converter 32 is, for example, an AC-DC converter. A direct current side terminal of the converter 32 is connected to a direct current link DL. The battery 40 is connected to the direct current link DL via the VCU 34. The converter 32 converts alternating current generated by the motor 12 into direct current and outputs the direct current to the direct current link DL.

The VCU 34 is, for example, a DC-DC converter. The VCU 34 boosts electric power supplied from the battery 40 and outputs the boosted electric power to the direct current link DL.

The control unit 36 includes, for example, a motor control unit, a brake control unit, and a battery and VCU control unit. The motor control unit, the brake control unit, and the battery and VCU control unit may be replaced with separate control devices, for example, control devices such as a motor ECU, a brake ECU, and a battery ECU, respectively.

The control unit 36 includes a mode control unit for performing travel control in accordance with a travel mode selected from a plurality of travel modes. As the travel mode, for example, a saving mode, a high output mode, or a standard mode is set. The saving mode is, for example, a mode for inhibiting electric power consumption when driving performance is lowered, and the high output mode is, for example, a mode for improving driving performance when electric power consumption is increased. The standard mode is a mode between the saving mode and the high output mode.

The motor control unit controls the motor 12 on the basis of outputs of the vehicle sensors 20. The brake control unit controls the brake device 16 on the basis of the outputs of the vehicle sensors 20. The battery and VCU control unit calculates a state of charge (SOC; hereinafter also referred to as a "battery charge rate") of the battery 40 on the basis of outputs of the battery sensors 42 attached to the battery 40 and outputs the SOC to the VCU 34 and the display device 60. The VCU 34 increases a voltage of the direct current link DL in accordance with an instruction from the battery and VCU control unit. The motor control unit calculates an electricity expense of the electric vehicle 10 on the basis of the outputs of the vehicle sensors 20 and a transition in the SOC of the battery 40. The motor control unit calculates the electricity expense of the electric vehicle 10 for each travel mode. The motor control unit outputs the calculated electricity expense to the communication device 50 as electricity expense information.

The battery 40 is, for example, a secondary battery such as a lithium ion battery. The battery 40 stores electric power introduced from the charge and discharge devices 200 outside the electric vehicle 10 and discharges the electric power for travel of the electric vehicle 10. The battery sensors 42 include, for example, a current sensor, a voltage sensor, and a temperature sensor. The battery sensors 42 detect, for example, a current value, a voltage value, and a temperature of the battery 40. The battery sensors 42 output the detected current value, voltage value, temperature, and the like to the control unit 36 and the communication device 50.

The communication device 50 includes a wireless module for providing connection to a cellular network or a Wi-Fi network. The communication device 50 acquires battery usage status information such as a current value, a voltage value, and a temperature output from the battery sensors 42 and transmits the information to the management device 100 via a network NW shown in FIG. 1. The communication device 50 transmits the electricity expense information output by the motor control unit of the control unit 36 to the management device 100. The communication device 50 adds battery type information and vehicle type information of a subject vehicle to the transmitted battery usage status information and electricity expense information. The communication device 50 receives information transmitted by the management device 100 via the network NW. The communication device 50 outputs the received information to the display device 60.

The display device 60 includes, for example, a display unit 61 and a display control unit 62. The display unit 61 displays information in accordance with control of the display control unit 62. The display control unit 62 causes the display unit 61 to display images based on information transmitted by the management device 100 in accordance with information output by the control unit 36 and the communication device 50. The display control unit 62 causes the display unit 61 to display a vehicle speed and the like output by the vehicle sensors 20.

The charging port 70 is provided outside a vehicle body of the electric vehicle 10. The charging port 70 is connected to the charge and discharge devices 200 via a charging cable 220. The charging cable 220 includes a first plug 222 and a second plug 224. The first plug 222 is connected to the charge and discharge devices 200, and the second plug 224 is connected to the charging port 70. Electric power supplied from the charge and discharge devices 200 is supplied to the charging port 70 via the charging cable 220. Electric power supplied from the battery 40 to the charging port 70 is supplied to the charge and discharge devices 200 via the charging cable 220.

The charging cable 220 includes a signal cable attached to a power cable. The signal cable mediates communication between the electric vehicle 10 and the charge and discharge devices 200. Therefore, each of the first plug 222 and the second plug 224 is provided with a power connector and a signal connector.

The converter 72 is provided between the charging port 70 and the battery 40. The converter 72 converts a current introduced from the charge and discharge devices 200 via the charging port 70, for example, an alternating current, to a direct current. The converter 72 outputs the converted direct current to the battery 40. The converter 72 converts a current introduced from the battery 40, for example, a direct current, into an alternating current. The converter 72 outputs the converted alternating current to the charging port 70.

[Management Device]

As shown in FIG. 1, the management device 100 includes a communication unit 110, an electric power detection unit 120, a control unit 130, and a storage unit 140. The electric power detection unit 120 and the control unit 130 are each realized by, for example, a hardware processor such as a central processing unit (CPU) executing a program (software). Some or all of these components are realized by hardware (a circuit unit; including circuitry) such as a large scale integration (LSI), an application specific integrated circuit (ASIC), a field-programmable gate array (FPGA), and a graphics processing unit (GPU), or software in cooperation with hardware. The program may be stored in advance in a storage device (a storage device including a non-transitory storage medium) such as a hard disk drive (HDD) or a flash memory of the management device 100, or may be stored in a removable storage medium such as a DVD or a CD-ROM and installed in the HDD or flash memory of the management device 100 by mounting a storage medium (non-transitory storage medium) in a drive device.

The communication unit 110 includes a communication interface such as a network interface card (NIC). The communication unit 110 transmits and receives information between a plurality of charge and discharge devices 200 and an electric power company that manages the second electric power system 270 via the network NW. The network NW includes, for example, the Internet, a wide area network (WAN), a local area network (LAN), a provider device, a wireless base station, and the like.

The communication unit 110 receives charging information generated by each of the plurality of charge and discharge devices 200. The charging information includes information such as a voltage and an SOC of the battery of the electric vehicle 10. Further, the communication unit 110 may acquire a voltage and an SOC of the stationary battery 280. The communication unit 110 receives power failure information provided from, for example, an electric power company. The communication unit 110 may receive voltage information of the first electric power system 400 from a voltage sensor provided in the first electric power system 400.

The electric power detection unit 120 detects that electric power supply from the first electric power system 400 has stopped on the basis of the information received by the communication unit 110. The electric power detection unit 120 detects that the electric power supply from the first electric power system 400 has stopped on the basis of, for example, the power failure information provided by the electric power company or the like. The electric power detection unit 120 may detect that the electric power supply from the first electric power system 400 has stopped when an amount of decrease in the voltage supplied to the first electric power system 400 is equal to or greater than a threshold, on the basis of the voltage information received from the voltage sensor provided in the first electric power system 400.

The control unit 130 performs control of allocating electric power between the charge and discharge entities on the basis of states of the charge and discharge entities connected to the second electric power system 270. More specifically, the control unit 130 supplies electric power acquired from the electric vehicles 10 via the charge and discharge devices 200 to the stationary battery 280 from the second electric power system 270 and supplies electric power stored in the stationary battery 280 to the electric vehicles 10 connected to the charge and discharge devices 200 from the second electric power system 270. When the electric vehicles 10 are connected to the plurality of charge and discharge devices 200, the control unit 130 may set some of the electric vehicles 10 as charging targets and set other electric vehicles 10 as electric power supply sources. In this case, the control unit 130 supplies the electric power supplied to the charge and discharge devices 200 from the electric vehicles 10 serving as the electric power supply sources to the electric vehicles 10 serving as the charging targets from the second electric power system 270.

The storage unit 140 is realized by, for example, an HDD, a flash memory, an electrically erasable programmable read-only memory (EEPROM), a read only memory (ROM), a random access memory (RAM), or the like. The storage unit 140 stores, for example, battery data 142 and other information.

[Charge and Discharge Devices]

Each of the charge and discharge devices 200 includes a housing 202, a control device 204, a cable connection port 206, and a system switching unit 208. The first electric power system 400 is connected to the charge and discharge devices 200. A control device 204 is built in the housing 202. The charge and discharge devices 200 are installed, for example, in the garage of a home of a user who owns the passenger vehicle 10A or a parking lot of a facility which owns the specific electric vehicle 10B. Since it is possible to store and use electric power supplied at midnight by installing the charge and discharge devices 200, the user can charge the electric vehicle 10 with electric power inexpensively.

The control device 204 can communicate with the electric vehicle 10, the management device 100, and the electric power company that manages the first electric power system 400. The control device 204 controls electric power supply from the second electric power system 270 to the stationary battery 280 or the charge and discharge device 200 on the basis of input information from an input device (not shown) provided outside the housing 202 and information provided by the electric vehicle 10, the management device 100, and the electric power company. The control device 204 detects that the electric power supply from the first electric power system 400 has stopped on the basis of information provided from the management device 100.

The cable connection port 206 is formed to open on an outer surface of the housing 202. The charging cable 220 can be connected to the cable connection port 206. The charging cable 220 includes the first plug 222 and the second plug 224. The electric vehicle 10 is provided with a charging port (not shown). The first plug 222 is connected to the cable connection port 206 of the charge and discharge device 200, and the second plug 224 is connected to the charging port of the electric vehicle 10.

When the control device 204 does not detect stoppage of the electric power supply from the first electric power system 400, the system switching unit 208 switches an electric power system to which the charge and discharge device 200 is connected to the first electric power system 400. On the other hand, when the control device 204 detects the stoppage of the electric power supply from the second electric power system 270, the system switching unit 208 switches the electric power system to which the charge and discharge device 200 is connected to the second electric power system 270. In this case, electric power is supplied to or acquired by the electric vehicle 10 connected to the charge and discharge device 200 using the charge and discharge device 200.

The charge and discharge device 200 is connected to the stationary battery 280 via the second electric power system 270. The electric power supplied from the electric vehicle 10 to the charge and discharge device 200 is supplied to the stationary battery 280 via the second electric power system 270. The electric power supplied from the stationary battery 280 is supplied to the charge and discharge device 200 via the second electric power system 270.

The charge and discharge device 200 supplies electric power from at least one of the stationary battery 280 and the battery 40A used for travel of the passenger vehicle 10A to the battery 40B used for travel of the specific electric vehicle 10B described above. The passenger vehicle 10A is an example of a first electric vehicle, and the specific electric vehicle 10B is an example of a second electric vehicle. The battery 40A is an example of a first on-vehicle battery, and the battery 40B is an example of a second on-vehicle battery. The electric power supplied from the battery 40A to the charge and discharge device 200 via the charging cable 220 is supplied to the battery 40B via the second electric power system 270. The electric power supplied from the stationary battery 280 may be supplied to the battery 40B via the second electric power system 270.

The charging cable 220 includes the signal cable attached to the power cable. The signal cable mediates communication between the electric vehicle 10 or the specific electric vehicle 10B and the charge and discharge device 200. Each of the first plug 222 and the second plug 224 is provided with the power connector and the signal connector. The charge and discharge device 200 may be connectable to the network NW.

When the electric power detection unit 120 detects that the electric power supply from the first electric power system 400 has stopped and a power storage amount of the battery 40 used for travel of the electric vehicle 10 is less than a threshold, the control unit 130 controls at least some of the plurality of charge and discharge devices 200 to supply the electric power from the second electric power system 270 to the electric vehicle 10. Thus, electric power is supplied from the second electric power system 270 to the electric vehicle 10 connected to the charge and discharge devices 200 via the charge and discharge devices 200. When the specific electric vehicle 10B is connected to the charge and discharge device 200, the control unit 130 controls at least some of the plurality of charge and discharge devices 200 to supply electric power to the specific electric vehicle 10B preferentially as compared with the other electric vehicles 10. In this case, the control unit 130 refers to the battery data 142 stored in the storage unit 140 and selects a charge and discharge device 200, which is a control target, from among the plurality of charge and discharge devices 200.

FIG. 3 is a diagram showing an example of the battery data 142 according to the first embodiment. In the battery data 142, for example, a connection user ID is associated with a power storage amount, a type of battery, and a type of vehicle. The connection user ID is an ID (identification information) of the stationary battery 280 or the charge and discharge device 200 connected to the second electric power system 270. The connection user ID may be an ID (identification information) of the electric vehicle 10 connected to the charge and discharge device 200 or may be information indicating a type of the electric vehicle 10. The power storage amount is calculated on the basis of, for example, a charge capacity of the battery, an electric power amount charged and discharged by the battery, and the like. When the battery is the stationary battery 280, the type of battery is derived on the basis, for example, of information on the type of battery acquired from the stationary battery 280 via the network NW. When the battery is an on-vehicle battery of the electric vehicle 10 connected to the charge and discharge device 200, the type of battery is derived on the basis of, for example, information on the type of battery acquired from the electric vehicle 10 via the charge and discharge device 200 through the network NW. When the type of battery is an on-vehicle battery, the type of vehicle is derived on the basis of, for example, information on the type of vehicle acquired from the electric vehicle 10 through the network NW via the charge and discharge device 200. In the illustrated example, the type of vehicle includes a size of vehicle such as a large vehicle and a small vehicle in addition to a classification of vehicle such as a passenger vehicle and a fire vehicle.

When the electric power detection unit 120 detects that the electric power supply from the first electric power system 400 has stopped, the control unit 130 refers to the information on the type of vehicle in the battery data 142 and selects the connection user ID associated with the type of vehicle corresponding to the specific electric vehicle 10B. In the illustrated example, the connection user ID "1003" associated with the type of vehicle classified as a "fire vehicle" is selected. The control unit 130 specifies the battery corresponding to the selected connection user ID "1003" as the battery 40B mounted on the specific electric vehicle 10B classified as the "fire vehicle." The control unit 130 acquires the power storage amount corresponding to the specified battery 40B from the battery data 142. The control unit 130 controls at least some of the plurality of charge and discharge devices 200 to supply electric power from the second electric power system 270 to the specific electric vehicle 10B on condition that the acquired power storage amount is less than the threshold. When electric power is supplied to the specific electric vehicle 10B from a plurality of batteries constituting the stationary battery 280 and the battery 40A mounted on the passenger vehicle 10A, the control unit 130 allocates the electric power amount supplied from each of the plurality of batteries to the specific electric vehicle 10B such that a power storage amount of each of the plurality of batteries satisfies a constraint condition. The constraint condition is a condition for restricting the electric power amount supplied to the specific electric vehicle 10B from each of the plurality of batteries, and includes, for example, a lower limit value of the power storage amount of the battery after electric power supply and a range of the power storage amount. When electric power is supplied from a certain electric vehicle 10 to another electric vehicle 10 via the second electric power system 270, the control unit 130 controls at least some of the plurality of charge and discharge devices 200 such that the power storage amount of each of the batteries 40 of at least one or more electric vehicles 10 serving as electric power supply sources after supplying electric power satisfies the constraint condition.

Figure 4:
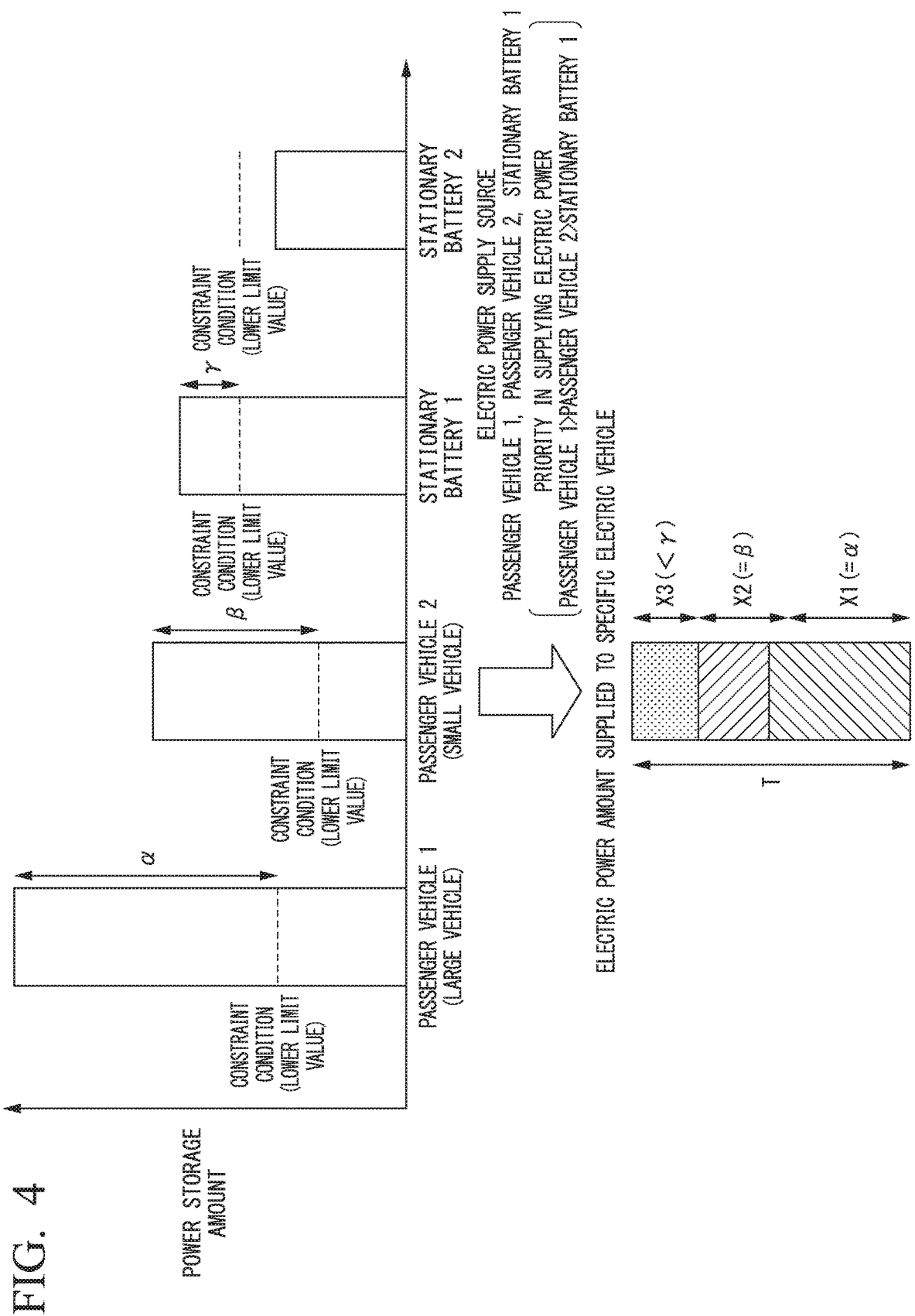
FIG. 4 is a diagram for explaining an example of allocation in an electric power amount supplied to a specific electric vehicle.

FIG. 4 is a diagram for explaining an example of allocation of the electric power amount supplied to the specific electric vehicle 10B. In the illustrated example, a "passenger vehicle 1," a "passenger vehicle 2," a "stationary battery 1," and a "stationary battery 2" are exemplified as candidates of the electric power supply sources for the specific electric vehicle 10B. In this example, among these candidates, power storage amounts of the "passenger vehicle 1," the "passenger vehicle 2," and the "stationary battery 1" exceed the lower limit value set as an example of the constraint condition, these are selected as the electric power sources for the specific electric vehicle 10B. The electric power amount which is supplied to the specific electric vehicle 10B is allocated in accordance with the power storage amount of the batteries selected as the electric power supply sources. In this case, a priority in the case of supplying electric power to the specific electric vehicle 10B is set in accordance with differences between power storage amounts of the selected electric power supply sources and the lower limit value.

In this example, the priority is set in the order of the "passenger vehicle 1," the "passenger vehicle 2," and the "stationary battery 1." A demand amount T of electric power supplied to the specific electric vehicle 10B is set in advance. Then, the difference a between a power storage amount of the "passenger vehicle 1" having the highest priority and the lower limit value is allocated as an electric power amount X1 supplied from the "passenger vehicle 1" to the specific electric vehicle 10B. The difference 13 between a power storage amount of the "passenger vehicle 2" having the second highest priority and the lower limit value is allocated as an electric power amount X2 supplied from the "passenger vehicle 2" to the specific electric vehicle 10B. The electric power amount obtained by subtracting a total value of the amounts of electric power allocated to the "passenger vehicle 1" and the "passenger vehicle 2" from the demand amount T of the electric power supplied to the specific electric vehicle 10B is allocated as an electric power amount X3 supplied to the specific electric vehicle 10B from the "stationary battery 1" having the third highest priority. In the illustrated example, in the case of allocating an electric power amount to the specific electric vehicle 10B, the lower limit value differs depending on a charge capacity of each battery. More specifically, the lower limit value of the "passenger vehicle 1," which is a large vehicle having a relatively large battery charge capacity, is greater than that of the "passenger vehicle 2," which is a small vehicle having a relatively small battery charge capacity. However, a common lower limit value may be set for the "passenger vehicle 1" and the "passenger vehicle 2." In the illustrated example, although the passenger vehicle 10A and the stationary battery 280 are compared to each other under different conditions, the passenger vehicle 10A and the stationary battery 280 may be compared to each other under common conditions.

[Process Flow of Management Device]

Figure 5:
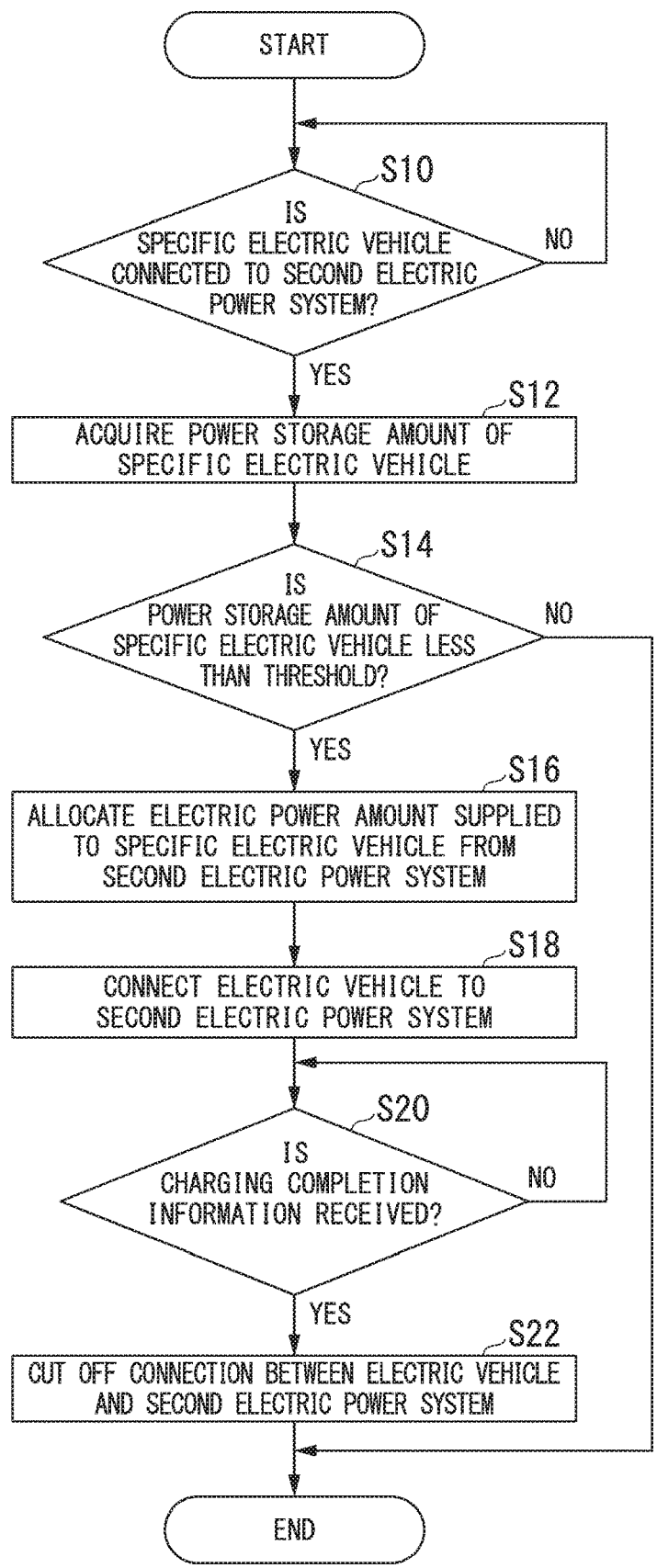
FIG. 5 is a flowchart for explaining a flow of a series of processes of the management device according to the first embodiment.

Hereinafter, a flow of a series of processes of the management device 100 according to the first embodiment will be described using a flowchart. FIG. 5 is a flowchart for explaining the flow of the series of processes of the management device 100 according to the first embodiment. The processes of this flowchart may be started, for example, on condition that the electric power supply from the first electric power system 400 has stopped.

First, the control unit 130 determines whether or not the specific electric vehicle 10B is connected to the second electric power system 270 (step S10). When it is determined that the specific electric vehicle 10B has not been connected to the second electric power system 270, the control unit 130 waits until the specific electric vehicle 10B is connected to charge and discharge device 200 and connected to second electric power system 270 via the charge and discharge device 200. On the other hand, when it is determined that the specific electric vehicle 10B is connected to the second electric power system 270, the control unit 130 acquires the power storage amount of the specific electric vehicle 10B from the battery data 142 (step S12). Next, the control unit 130 determines whether or not the power storage amount of the specific electric vehicle 10B is less than the threshold (step S14). When it is determined that the power storage amount of the specific electric vehicle 10B is less than the threshold, the control unit 130 allocates the electric power amount supplied from the second electric power system 270 to the specific electric vehicle 10B (step S16). Next, the control unit 130 controls a predetermined charge and discharge device 200 among the plurality of charge and discharge devices 200 to connect the electric vehicle 10 serving as an electric power supply source to the second electric power system 270 (step S18). Next, the control unit 130 determines whether or not charging completion information has been received from the charge and discharge device 200 to which the specific electric vehicle 10B is connected (step S20). When it is determined that the charging completion information has been received, the control unit 130 controls the predetermined charge and discharge device 200 among the plurality of charge and discharge devices 200 to cut off connection between the electric vehicle 10 serving as the electric power supply source and the second electric power system 270 (step S22). In this way, the processes of this flowchart end.

According to the management device 100 of the first embodiment described above, a possibility that the electric vehicle 10 can continue traveling even when the electric power supply has stopped can be increased. Since the electric vehicle 10 cannot be charged on the basis of the electric power supply from the first electric power system 400, for example, when the power storage amount of the electric vehicle 10 is small at the time of a power failure, it is difficult to continue traveling of the electric vehicle 10. Therefore, the management device 100 according to the first embodiment can cause the electric vehicle 10 to continue traveling on the basis of the electric power supply from the second electric power system 270 that is a power system different from the first electric power system 400 even during the power failure. For this reason, the possibility that the electric vehicle 10 can continue traveling during the power failure can be increased.

According to the management device 100, the possibility that the specific electric vehicle 10B can continue traveling during the power failure can be further increased. For example, the specific electric vehicle 10B such as a police vehicle, an ambulance vehicle, or a fire vehicle is a vehicle that is required to continue traveling even during the power failure. Therefore, in the case in which both the passenger vehicle 10A and the specific electric vehicle 10B are included as the electric vehicles 10 whose power storage amounts are small at the time of the power failure, the management device 100 supplies electric power from the second electric power system 270 preferentially to the specific electric vehicle 10B. For this reason, it is possible to further increase the possibility that the specific electric vehicle 10B can continue traveling during the power failure.

Second Embodiment

Hereinafter, a second embodiment will be described. The second embodiment is different from the first embodiment in the method of allocating the electric power amount supplied to the specific electric vehicle. Hereinafter, the difference will be mainly described.

FIG. 6 is a diagram showing an example of battery data 142A according to the second embodiment. As compared with the battery data 142, the battery data 142A includes items of a power generation function of the vehicle, in addition to the connection user ID, the power storage amount, the type of battery, and the type of vehicle. When the type of battery is an on-vehicle battery, the power generation function of the vehicle is derived on the basis of information acquired from the electric vehicle 10 through the network NW via the charge and discharge devices 200, for example.

Figure 7:
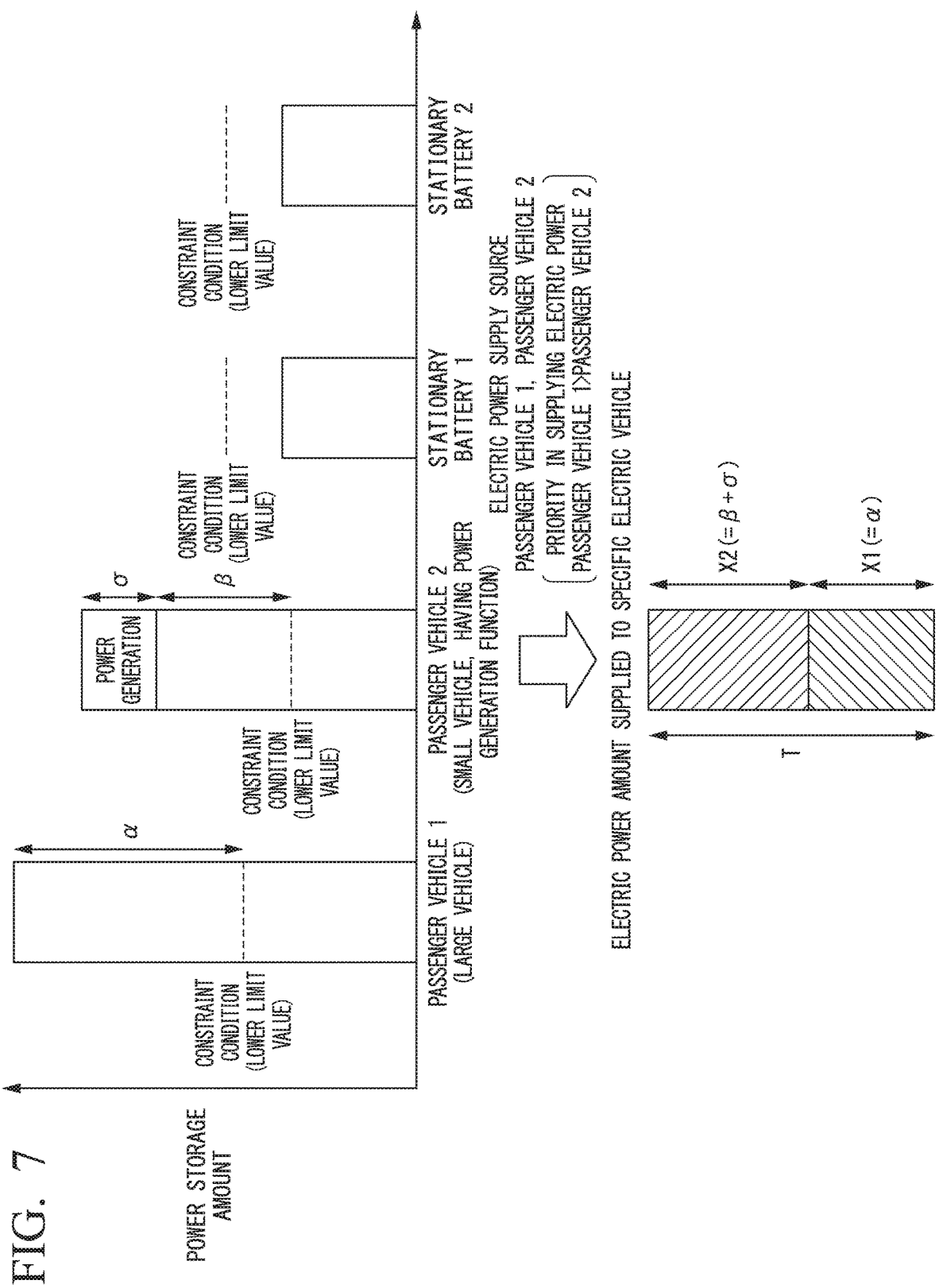
FIG. 7 is a diagram for explaining an example of allocation in an electric power amount supplied to a specific electric vehicle.

FIG. 7 is a diagram for explaining an example of allocation of the electric power amount supplied to the specific electric vehicle 10B. In the illustrated example, the "passenger vehicle 1," the "passenger vehicle 2," the "stationary battery 1," and the "stationary battery 2" are exemplified as candidates of the electric power supply sources to the specific electric vehicle 10B. In this example, among these candidates, since power storage amounts of the "passenger vehicle 1" and the "passenger vehicle 2" exceed the lower limit value set as an example of the constraint condition, these are selected as the electric power supply sources for the specific electric vehicle 10B. The electric power amount to be supplied to the specific electric vehicle 10B is allocated in accordance with the power storage amount of the battery selected as the electric power supply source. In this case, the priority in the case of supplying electric power to the specific electric vehicle 10B is set in accordance with a difference between the power storage amount of the selected power supply source and the lower limit value.

In this example, the priority is set in the order of the "passenger vehicle 1" and the "passenger vehicle 2." The demand amount T of the electric power supplied to the specific electric vehicle 10B is set in advance. However, in the illustrated example, a total value of the difference a between the power storage amount of the "passenger vehicle 1" and the lower limit value and the difference 13 between the power storage amount of the "passenger vehicle 2" and the lower limit value is less than the demand amount T of the electric power supplied to the specific electric vehicle 10B. That is, the electric power amount that the electric power can be supplied via the second electric power system 270 is insufficient for demand. For this reason, generation of electric power is requested to the "passenger vehicle 2" having a power generation function to generate an electric power amount obtained by subtracting the total value of the difference a and the difference 13 from the demand amount T of the electric power. As a result, the generated electric power amount 6 is added to the power storage amount of the "passenger vehicle 2." Then, the difference a between the power storage amount of the "passenger vehicle 1" and the lower limit value is allocated as the electric power amount X1 supplied from the "passenger vehicle 1" to the specific electric vehicle 10B. A difference ($\beta+\sigma$) between the power storage amount of the "passenger vehicle 2" including the generated electric power amount and the lower limit value is allocated as the electric power amount X2 supplied from the "passenger vehicle 2" to the specific electric vehicle 10B.

Figure 8:
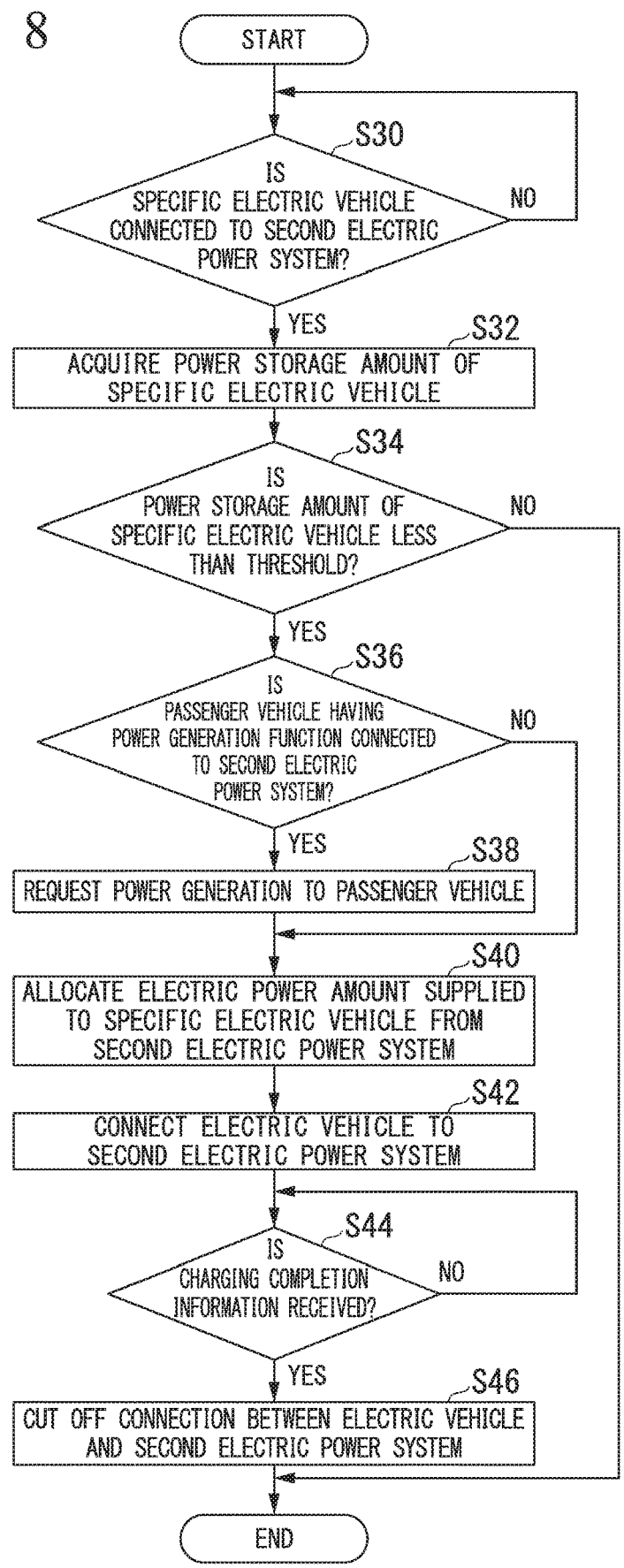
FIG. 8 is a flowchart for explaining a flow of a series of processes of a management device according to the second embodiment.

Hereinafter, a flow of a series of processes of the management device 100 according to the second embodiment will be described using a flowchart. FIG. 8 is a flowchart for explaining the flow of the series of processes of the management device 100 according to the second embodiment. The processes of this flowchart may be started, for example, on condition that the electric power supply from the first electric power system 400 has stopped.

First, the control unit 130 determines whether or not the specific electric vehicle 10B is connected to the second electric power system 270 (step S30). When the control unit 130 determines that the specific electric vehicle 10B is connected to the second electric power system 270, the control unit 130 acquires the power storage amount of the specific electric vehicle 10B from the battery data 142 (step S32). Next, the control unit 130 determines whether or not the power storage amount of the specific electric vehicle 10B is less than the threshold (step S34). When it is determined that the power storage amount of the specific electric vehicle 10B is less than the threshold, the control unit 130 determines whether or not the passenger vehicle 10A having a power generation function is connected to the second electric power system 270 (step S36). When it is determined that the passenger vehicle 10A having the power generation function is connected to the second electric power system 270, the control unit 130 requests the passenger vehicle 10A connected to the second electric power system 270 to generate electric power (step S38). Next, the control unit 130 allocates the electric power amount supplied from the second electric power system 270 to the specific electric vehicle 10B, including the passenger vehicle 10A that has requested generation of electric power (step S40). Next, the control unit 130 connects the electric vehicle 10 serving as the electric power supply source to the second electric power system 270 (step S42). Next, the control unit 130 determines whether or not charging completion information has been received from the charge and discharge devices 200 to which the specific electric vehicle 10B is connected (step S44). When it is determined that charging completion information has been received, the control unit 130 controls a predetermined charge and discharge device 200 among the plurality of charge and discharge devices 200 to cut off connection between the electric vehicle 10 serving as the electric power supply source and the second electric power system 270 (step S46). In this way, the processes of this flowchart end.

According to the management device 100 of the second embodiment described above, in addition to effects of the management device 100 according to the first embodiment, the possibility that the electric vehicle 10 can continue traveling during a power failure can be further increased. For example, even when the power storage amount of the electric vehicle 10 is small at the time of the power failure, the power storage amount of the stationary battery 280 or another electric vehicle 10 may be insufficient. Therefore, according to the management device 100 of the second embodiment, at the time of the power failure, when the electric vehicle 10 serving as the electric power supply source has a power generation function, generation of electric power is requested to the electric vehicle 10 and electric power is supplied to the electric vehicle 10 that is a charging target, also including the electric power amount generated by the electric vehicle 10. For this reason, it is possible to further increase the possibility that the electric vehicle 10 can continue traveling during the power failure.

While aspects for carrying out the present invention has been described using the embodiments described above, the present invention is not limited to such embodiments at all and various modifications and substitutions can be made without departing from the spirit of the present invention.

What is claimed is:

1. An emergency electric power supply system comprising:
    an electric power detection unit configured to detect that electric power supply from a first electric power system has stopped;
    a plurality of charge and discharge devices which cause electric power to be transferred between a second electric power system, which is an electric power system different from the first electric power system and is connectable to a plurality of charge and discharge entities including an electric vehicle, and the charge and discharge entities; and
    a control unit that controls at least some of the plurality of charge and discharge devices to supply electric power from the second electric power system to the electric vehicle when the electric power detection unit detects that the electric power supply from the first electric power system has stopped,
    wherein the control unit controls at least some of the plurality of charge and discharge devices to supply the electric power preferentially to a specific electric vehicle as compared with other electric vehicles when the specific electric vehicle is connected to the second electric power system, the specific electric vehicle being an electric vehicle as an emergency vehicle.

2. The emergency electric power supply system according to claim 1, wherein the control unit controls at least some of the plurality of charge and discharge devices to supply the electric power from the second electric power system to the electric vehicle when the electric power detection unit detects that the electric power supply from the first electric power system has stopped and a power storage amount of an on-vehicle battery used for travel of the electric vehicle is less than a threshold.

3. The emergency electric power supply system according to claim 1, wherein the control unit controls at least some of the plurality of charge and discharge devices such that a power storage amount of each of at least one or more batteries of electric vehicles serving as electric power supply sources after supplying the electric power satisfies a constraint condition when the electric power is supplied from one electric vehicle to another electric vehicle via the second electric power system.

4. The emergency electric power supply system according to claim 1,
wherein the electric vehicle includes an electric vehicle having a power generation function, and
in the case in which the electric vehicle having the power generation function is connected to the second electric power system, the control unit requests the electric vehicle having the power generation function to generate electric power when an electric power amount that can be supplied through the second electric power system is insufficient for demand.

5. The emergency electric power supply system according to claim 1,
wherein a stationary battery is connected to the second electric power system, and
the control unit controls at least some of the plurality of charge and discharge devices such that the electric power is supplied from an electric vehicle connected to the stationary battery and the second electric power system to another electric vehicle.

6. An emergency electric power supply method causing a computer to execute processes of:
detecting that electric power supply from a first electric power system has stopped;
causing electric power to be transferred between a second electric power system, which is an electric power system different from the first electric power system and is connectable to a plurality of charge and discharge entities including an electric vehicle, and the charge and discharge entities; and
controlling at least some of a plurality of charge and discharge devices to supply electric power from the second electric power system to the electric vehicle when it is detected that the electric power supply from the first electric power system has stopped,
wherein controlling at least some of the plurality of charge and discharge devices to supply the electric power comprises controlling at least some of the plurality of charge and discharge devices to supply the electric power preferentially to a specific electric vehicle as compared with other electric vehicles when the specific electric vehicle is connected to the second electric power system, the specific electric vehicle being an electric vehicle as an emergency vehicle.

7. A non-transitory computer-readable storage medium which stores a program causing a computer to execute processes of:
detecting that electric power supply from a first electric power system has stopped;
causing electric power to be transferred between a second electric power system, which is an electric power system different from the first electric power system and is connectable to a plurality of charge and discharge entities including an electric vehicle, and the charge and discharge entities; and
controlling at least some of a plurality of charge and discharge devices to supply electric power from the second electric power system to the electric vehicle when it is detected that the electric power supply from the first electric power system has stopped,
wherein controlling at least some of the plurality of charge and discharge devices to supply the electric power comprises controlling at least some of the plurality of charge and discharge devices to supply the electric power preferentially to a specific electric vehicle as compared with other electric vehicles when the specific electric vehicle is connected to the second electric power system, the specific electric vehicle being an electric vehicle as an emergency vehicle.

* * * * *